(12) United States Patent
Pendeyala et al.

(10) Patent No.: US 11,919,658 B2
(45) Date of Patent: Mar. 5, 2024

(54) AUTOMATED PILOT VISIBILITY LIGHTS

(71) Applicant: GOODRICH CORPORATION, Charlotte, NC (US)

(72) Inventors: Anisha Reddy Pendeyala, Hyderabad (IN); Bhavya Chunchu, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/709,038

(22) Filed: Mar. 30, 2022

(65) Prior Publication Data

US 2023/0136131 A1    May 4, 2023

(30) Foreign Application Priority Data

Oct. 30, 2021  (IN) .............................. 202141049858

(51) Int. Cl.
*B64D 47/04*    (2006.01)
*B60Q 1/14*    (2006.01)

(52) U.S. Cl.
CPC .............. *B64D 47/04* (2013.01); *B60Q 1/143* (2013.01); *B60Q 2300/13* (2013.01); *B60Q 2300/31* (2013.01); *B60Q 2800/30* (2022.05)

(58) Field of Classification Search
CPC ........ B64D 47/04; B64D 47/08; B60Q 1/143; B60Q 2300/13; B60Q 2300/31
See application file for complete search history.

(56) References Cited

U.S. PATENT DOCUMENTS

| | | | |
|---|---|---|---|
| 4,210,930 A * | 7/1980 | Henry .................. | G01S 13/785 342/410 |
| 9,176,314 B1 | 11/2015 | Hartwell | |
| 10,543,933 B1 | 1/2020 | Tillotson | |
| 10,723,482 B1 | 7/2020 | Salesse-Lavergne | |
| 10,793,288 B2 | 10/2020 | Pawliczek et al. | |
| 2002/0018009 A1* | 2/2002 | Rast ....................... | G08G 5/065 340/961 |

(Continued)

FOREIGN PATENT DOCUMENTS

| | | | | | |
|---|---|---|---|---|---|
| CN | 112815258 A | * | 5/2021 | ............. | B64C 3/56 |
| EP | 3193228 A2 | * | 7/2017 | ............. | B64D 47/02 |

(Continued)

*Primary Examiner* — Abdullah A Riyami
*Assistant Examiner* — Syed M Kaiser
(74) *Attorney, Agent, or Firm* — SNELL & WILMER L.L.P.

(57) ABSTRACT

Automated control of one or more exterior aircraft lights is presented, for instance exterior aircraft lights that enhance visibility by a pilot and including landing lights, taxi lights, and runway turnoff lights. One aspect of this automated control is that one or more of such exterior aircraft lights may be automatically activated, for instance when the aircraft has at least initiated movement and has not yet reached a certain altitude (e.g., while the aircraft is taxiing on the ground and including during takeoff). Another aspect of this automated control is that a trained image classification model may determine a visibility classification for an image acquired by an exterior aircraft camera, and this visibility classification may be used to automatically control the operation of one of more of such exterior aircraft lights (e.g., an intensity of the light output from such an exterior aircraft light(s)).

18 Claims, 12 Drawing Sheets

(56) References Cited

U.S. PATENT DOCUMENTS

| | | | |
|---|---|---|---|
| 2012/0007979 A1* | 1/2012 | Schneider | G08G 5/025 |
| | | | 348/116 |
| 2017/0203855 A1* | 7/2017 | Leclear | B64D 47/06 |
| 2019/0043201 A1* | 2/2019 | Strong | G06V 10/96 |
| 2019/0068863 A1 | 2/2019 | Boer | |
| 2021/0114746 A1 | 4/2021 | Schallenberg et al. | |
| 2022/0169401 A1* | 6/2022 | Di Cosola | B64F 1/32 |
| 2022/0263412 A1* | 8/2022 | Bertolini | H02M 1/08 |

FOREIGN PATENT DOCUMENTS

| | | | | |
|---|---|---|---|---|
| EP | 3284684 A1 * | 2/2018 | | B64D 47/04 |
| EP | 3543145 A1 * | 9/2019 | | B64C 5/02 |
| EP | 3626631 A1 * | 3/2020 | | B64C 3/56 |
| EP | 3766785 | 1/2021 | | |

* cited by examiner

AUTOMATED PILOT VISIBILITY LIGHTS

CROSS-REFERENCE TO RELATED APPLICATIONS

This application claims priority to, and the benefit of, India Patent Application No. 202141049858, filed Oct. 30, 2021 and titled "AUTOMATED PILOT VISIBILITY LIGHTS," which is incorporated by reference herein in its entirety for all purposes.

FIELD

The present disclosure generally relates to the field of exterior aircraft lighting and, more particularly, to automating control of certain exterior aircraft lights.

BACKGROUND

Certain exterior aircraft lights, such as landing lights, taxi lights, and runway turnoff lights, need to be turned on or activated for both takeoff and landing of the aircraft and regardless of the time of day or external visibility in accordance with FAA guidelines. Currently, these exterior aircraft lights are manually controlled by the pilot. Both takeoff and landing of an aircraft are crucial times in the operation of the aircraft, and again operation of the noted exterior aircraft lights currently requires manual intervention by the pilot.

Landing lights, taxi lights, and runway turnoff lights for an aircraft commonly produce high beam/high intensity light output. As such, operation of these exterior aircraft lights causes higher fuel consumption. Fuel for at least some aircraft while in flight is a non-renewable resource (e.g., aircraft that are not configured to be refueled during flight). In addition, landing lights, taxi lights, and runway turnoff lights are commonly operated at a constant light intensity, which also has a cost in relation to power/fuel consumption.

SUMMARY

What may be characterized as an exterior aircraft lighting (or light) control system is presented herein. Both the configuration of such an exterior aircraft light control system and the operational characteristics/operation of such an exterior aircraft light control system are within the scope of this Summary.

Automated control of at least one exterior aircraft light may include acquiring altitude data on an associated aircraft. This altitude data may be assessed/monitored to identify for an existence of an what may be characterized as an "altitude condition." This altitude condition (e.g., stored in memory, such as a predetermined altitude value) may exist when the altitude data is one of less than or no greater than a predetermined altitude. Such an assessment of the altitude data may be executed by a controller, and including without any required input or intervention by aircraft personnel. When an altitude condition is identified, at least one exterior light of the aircraft may be automatically activated, such as through the noted controller.

Automated control of at least one exterior aircraft light may entail capturing or acquiring a first image (e.g., a real-time image that is outside of the aircraft) with a first camera that is at least partially disposed on an exterior of the aircraft or that is otherwise able to acquire images exteriorly of the aircraft. The first camera may be of any appropriate size, shape, configuration, and/or type, and at least part of the first camera may be disposed at any appropriate location on the exterior of the aircraft. This first image from the first camera may be transmitted to a trained image classification model, which may process the image (or portion thereof) to determine a first visibility classification for the captured image. Operation of at least one exterior aircraft light may be controlled at least in part based on this determined first visibility classification. The automation of activating at least one exterior aircraft light and the automation of controlling the subsequent operation of at least one exterior aircraft light (e.g., the intensity of light output from a given exterior aircraft light) may be used individually or in combination.

Automated control in accordance with the foregoing may be used in relation to any appropriate exterior aircraft light or combination of exterior aircraft lights (including simultaneous control of multiple exterior aircraft lights), such as landing lights, taxi lights, and runway turnoff lights. Landing lights, taxi lights, and runway turnoff lights enhance visibility for the pilot during operation of the aircraft, and automating one or more aspects relating to these particular lights during taxiing of the aircraft, during take-off of the aircraft, and during landing of the aircraft allows the pilot/crew to focus on operation of the aircraft. Notwithstanding the foregoing, the aircraft may be configured to allow aircraft personnel (e.g., the pilot) to manually activate at least one exterior aircraft light and including to manually activate landing lights, taxi lights, and runway turnoff lights on a simultaneous basis.

The noted trained image classification model may be of a configuration that is selected from the group consisting of a machine learning configuration or a deep learning configuration (i.e., a given trained image classification module will be one of a machine learning configuration or a deep learning configuration). A support vector machine, a recurrent neural network, or a convolutional neural network each may be used for the trained image classification model.

Various aspects of the present disclosure are also addressed by the following examples and in the noted combinations:

1. A method of controlling an exterior aircraft light, comprising:
    acquiring altitude data of an aircraft;
    identifying a first altitude condition, said first altitude condition being that said altitude data is one of less than or no greater than a predetermined altitude, wherein said identifying is executed by a controller;
    activating a first exterior aircraft light in response to an existence of said first condition being identified, wherein said activating is executed by said controller;
    capturing a first image exteriorly of said aircraft;
    transmitting said first image to a trained image classification model;
    determining a first visibility classification for said first image using said trained image classification model; and
    controlling operation of said first exterior aircraft light based on said first visibility classification.

2. The method of example 1, wherein said first altitude condition is stored in memory and is accessible by said controller.

3. The method of any of examples 1-2, wherein said activating is automatically executed by said controller.

4. The method of any of examples 1-2, wherein said activating is executed by said controller without intervention by any personnel of said aircraft.

5. The method of any of examples 1-4, wherein said first exterior aircraft light is selected from the group consisting of landing lights, taxi lights, and runway turnoff lights.

6. The method of any of examples 1-4, wherein said activating further comprises activating a second exterior aircraft light and a third exterior aircraft light, wherein said first exterior aircraft light comprises landing lights, wherein said second exterior aircraft light comprises taxi lights, and wherein said third exterior aircraft light comprises runway turnoff lights.

7. The method of example 6, wherein said controlling further comprises controlling operation of each of said first exterior aircraft light, said second exterior aircraft light, and said third exterior aircraft light using said first visibility classification.

8. The method of any of examples 1-7, wherein said controlling comprises controlling a magnitude of a light output from said first exterior aircraft light.

9. The method of any of examples 1-8, wherein said controlling is automatically executed by said controller.

10. The method of any of examples 1-8, wherein said controlling is executed by said controller without intervention by any personnel of said aircraft.

11. The method of any of examples 1-10, wherein said trained image classification model is selected from the group consisting of a support vector machine, a recurrent neural network, or a convolutional neural network.

12. The method of any of examples 1-10, wherein said trained image classification model is of a configuration selected from the group consisting of a machine learning configuration or a deep learning configuration.

13. The method of any of examples 1-12, wherein said trained image classification model comprises a processor.

14. The method of any of examples 1-13, further comprising:
    capturing a second image exteriorly of said aircraft;
    transmitting said second image to said trained image classification model;
    determining a second visibility classification for said second image using said trained image classification model; and
    controlling operation of said first exterior aircraft light using whichever of said first visibility classification and said second visibility classification that maximizes a magnitude of a light output from said first exterior aircraft light.

15. An exterior aircraft lighting control system comprising:
    a first altitude condition stored in memory;
    a first exterior aircraft light;
    a trained image classification model, wherein said trained image classification model is configured to determine a visibility classification of an image; and
    a controller operatively interconnected with each of said first exterior aircraft light and said trained image classification model.

16. The exterior aircraft lighting control system of example 15, wherein said controller is configured to automatically activate said first exterior aircraft light when said first altitude condition is satisfied.

17. The exterior aircraft lighting control system of any of examples 15-16, wherein said first exterior aircraft light is selected from the group consisting of landing lights, taxi lights, and runway turnoff lights.

18. The exterior aircraft lighting control system of any of examples 15-17, wherein said trained image classification model is selected from the group consisting of a support vector machine, a recurrent neural network, or a convolutional neural network.

19. The exterior aircraft lighting control system of any of examples 15-17, wherein said trained image classification model is of a configuration selected from the group consisting of a machine learning configuration or a deep learning configuration.

20. The exterior aircraft lighting control system of any of examples 15-19, wherein said trained image classification model comprises a processor.

21. The exterior aircraft lighting control system of any of examples 15-20, wherein said controller is configured to automatically operate said first exterior aircraft light based upon a visibility classification output from said trained image classification model.

22. The exterior aircraft lighting control system of example 21, wherein said visibility classification output from said trained image classification model controls a magnitude of a light output from said first exterior aircraft light.

23. The exterior aircraft lighting control system of any of examples 15-22, further comprising a data structure that in turn comprises a plurality of stored visibility classifications, wherein each stored visibility classification is associated with at least one exterior light control parameter.

24. The exterior aircraft lighting control system of example 23, wherein said controller is operatively interconnected with said data structure.

25. A trained image classification model configured to determine a visibility classification of an image and further configured to control operation of an exterior aircraft light based on a determined visibility classification, wherein said trained image classification model is of a configuration selected from the group consisting of a machine learning configuration or a deep learning configuration.

26. The trained image classification model of example 25, wherein said trained image classification model is selected from the group consisting of a support vector machine, a recurrent neural network, or a convolutional neural network.

27. The trained image classification model of any of examples 25-26, wherein said trained image classification model comprises a processor.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

Figure 1A:
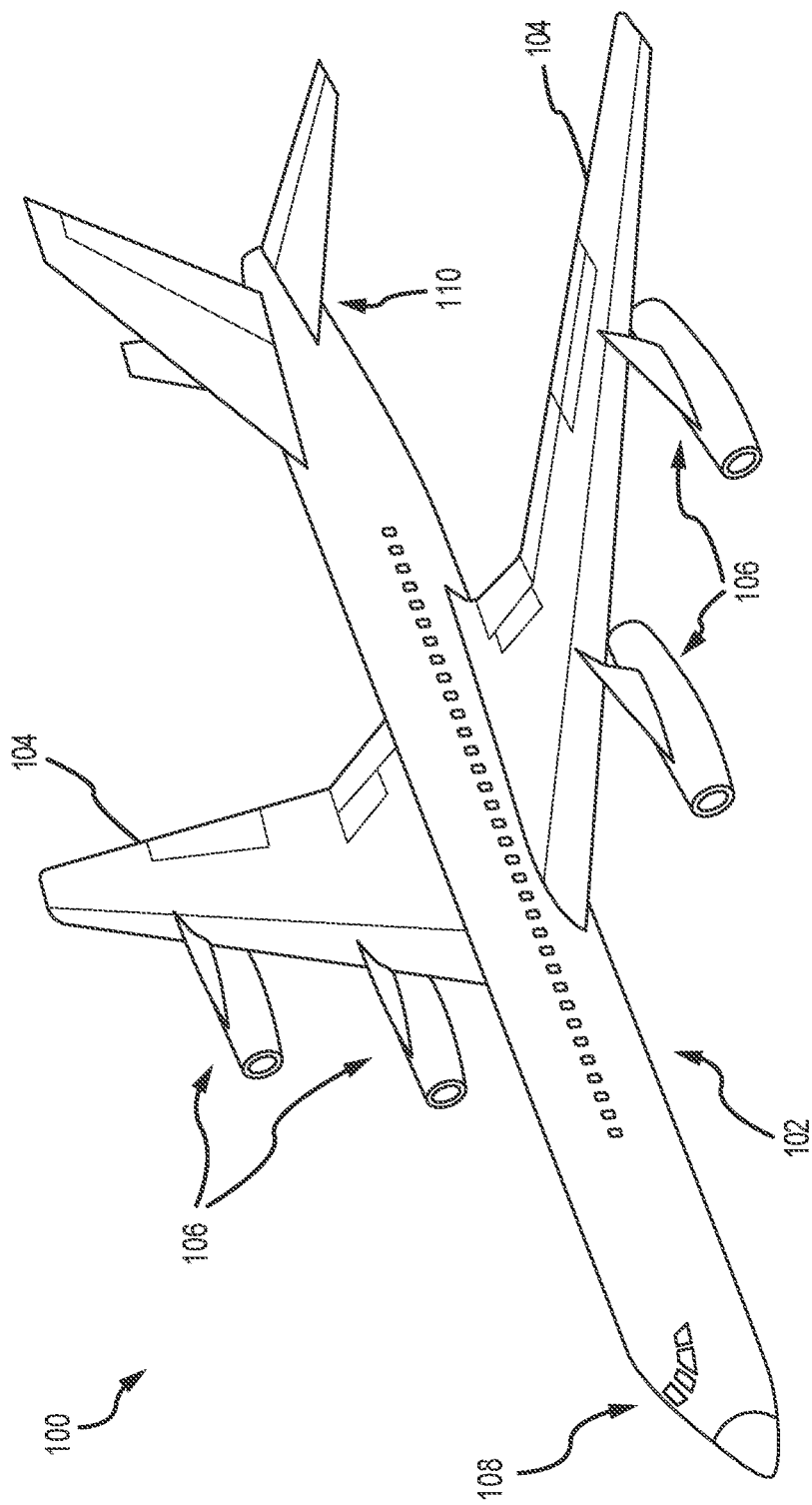
FIG. 1A is a perspective view of an aircraft in accordance with various embodiments.
Figure 1B:
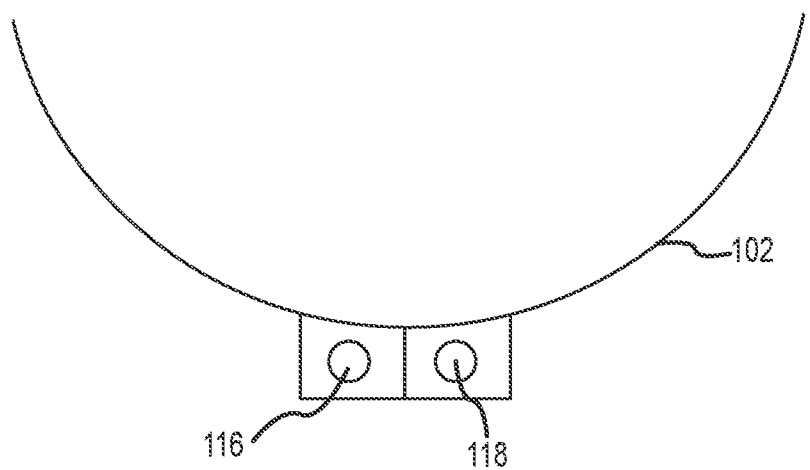
FIG. 1B is a cutaway schematic to illustrate a representative pair of exterior cameras for the aircraft of FIG. 1A, in accordance with various embodiments.
Figure 1C:
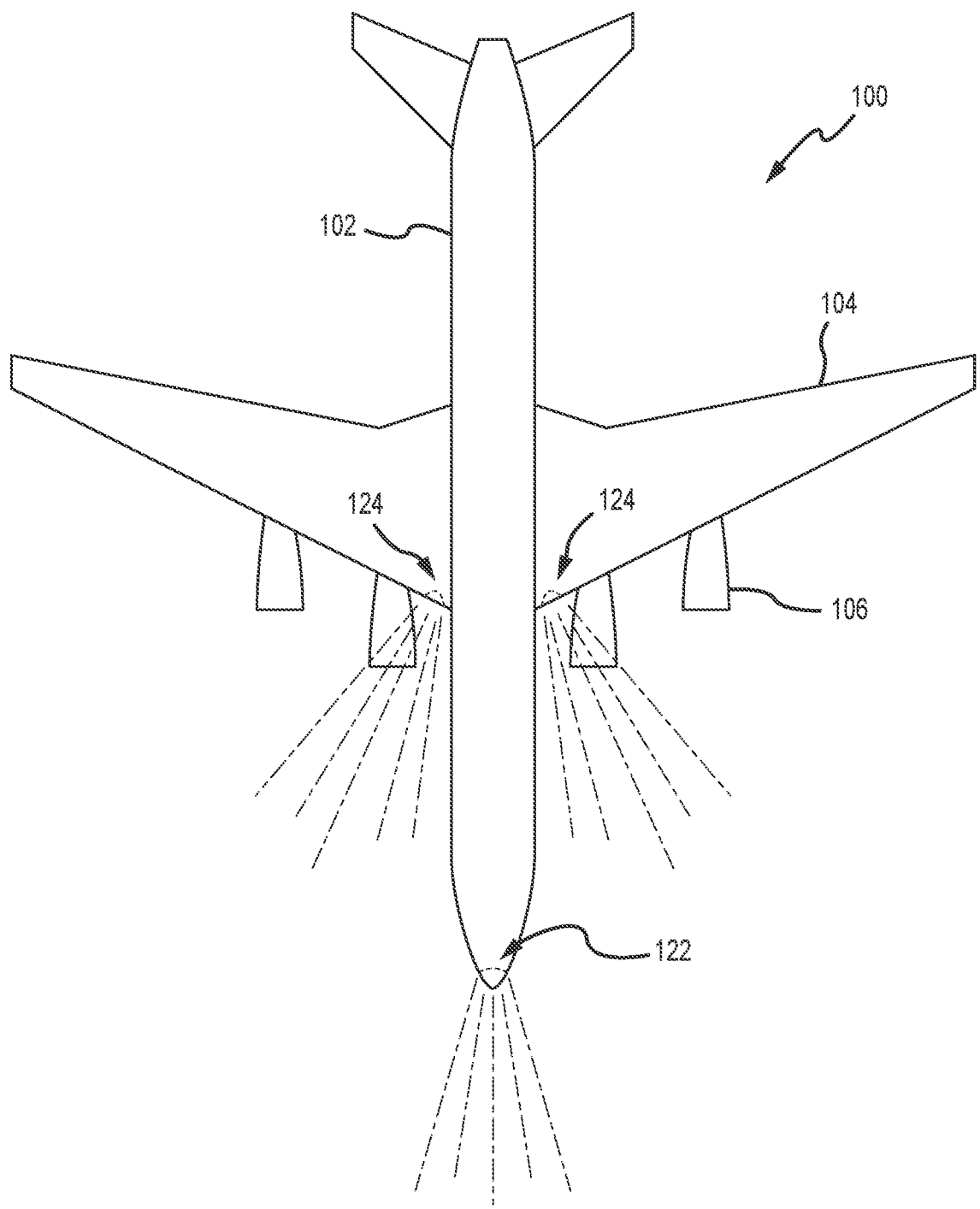
FIG. 1C is a top view of the aircraft of FIG. 1A to illustrate representative runway turnoff lights and taxi lights, in accordance with various embodiments.
Figure 1D:
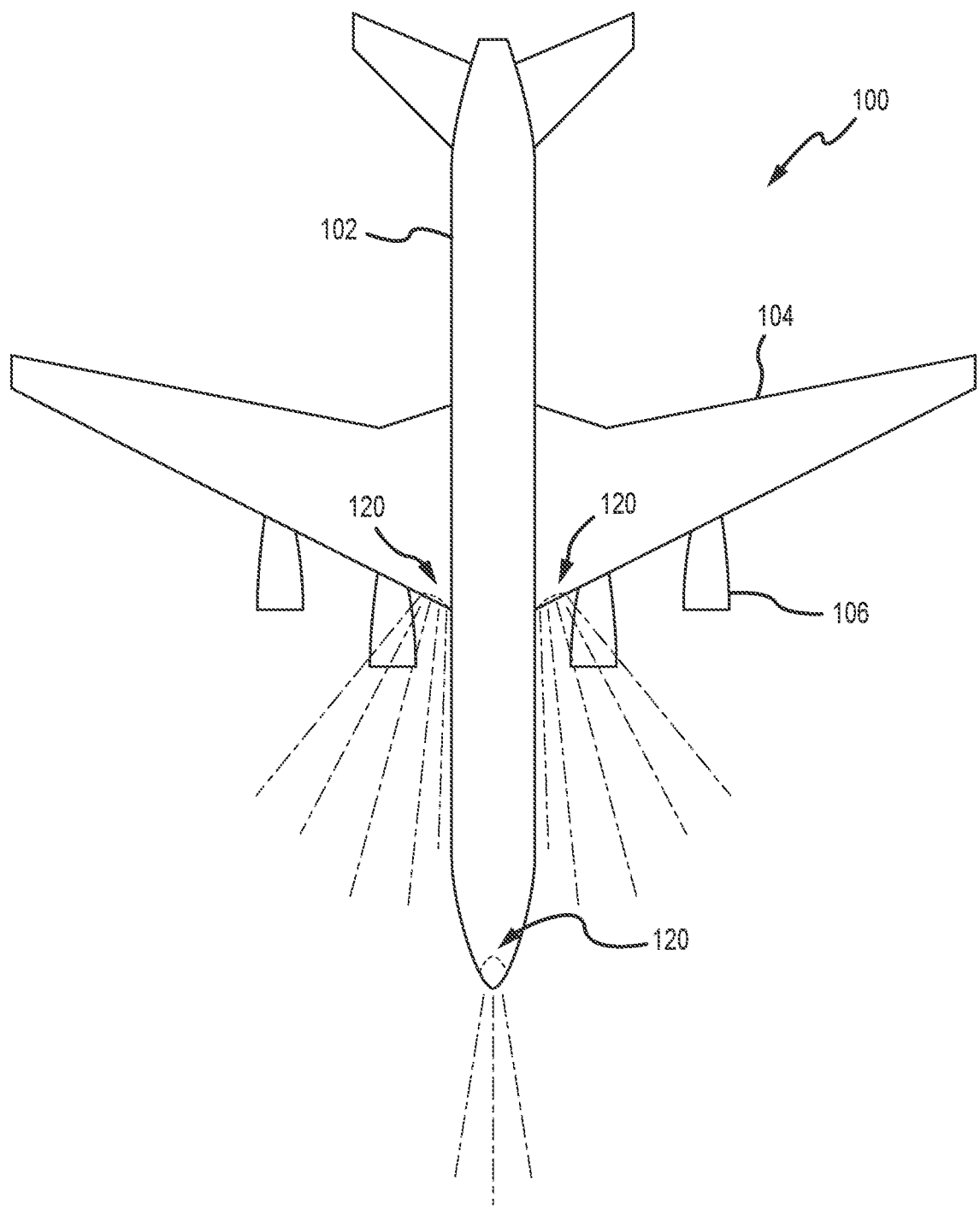
FIG. 1D is a top view of the aircraft of FIG. 1A to illustrate representative landing lights, in accordance with various embodiments.

An aircraft is illustrated in FIGS. 1A-1D and is identified by reference numeral 100. The aircraft 100 includes a fuselage 102, a pair of wings 104, a pair of engines 106 for each wing 104, a vertical stabilizer 110 at an aft end section of the aircraft 100, and a cockpit 108 at forward end section of the aircraft 100. A landscape camera 116 and a taxi aid camera 118 may be disposed aft of the forward landing gear of the aircraft 100 (or at any appropriate location) and may be mounted to/co-located on the fuselage 102 at any appropriate location. Each of the cameras 116, 118 may be of any appropriate size, shape, configuration, and/or type. The aircraft 100 also includes landing lights 120, taxi lights 122, and runway turnoff lights 124. These lights 120, 122, and 124 may be of any appropriate configuration and disposed at any appropriate location or combination of locations on the exterior of the aircraft 100.

Figure 2:
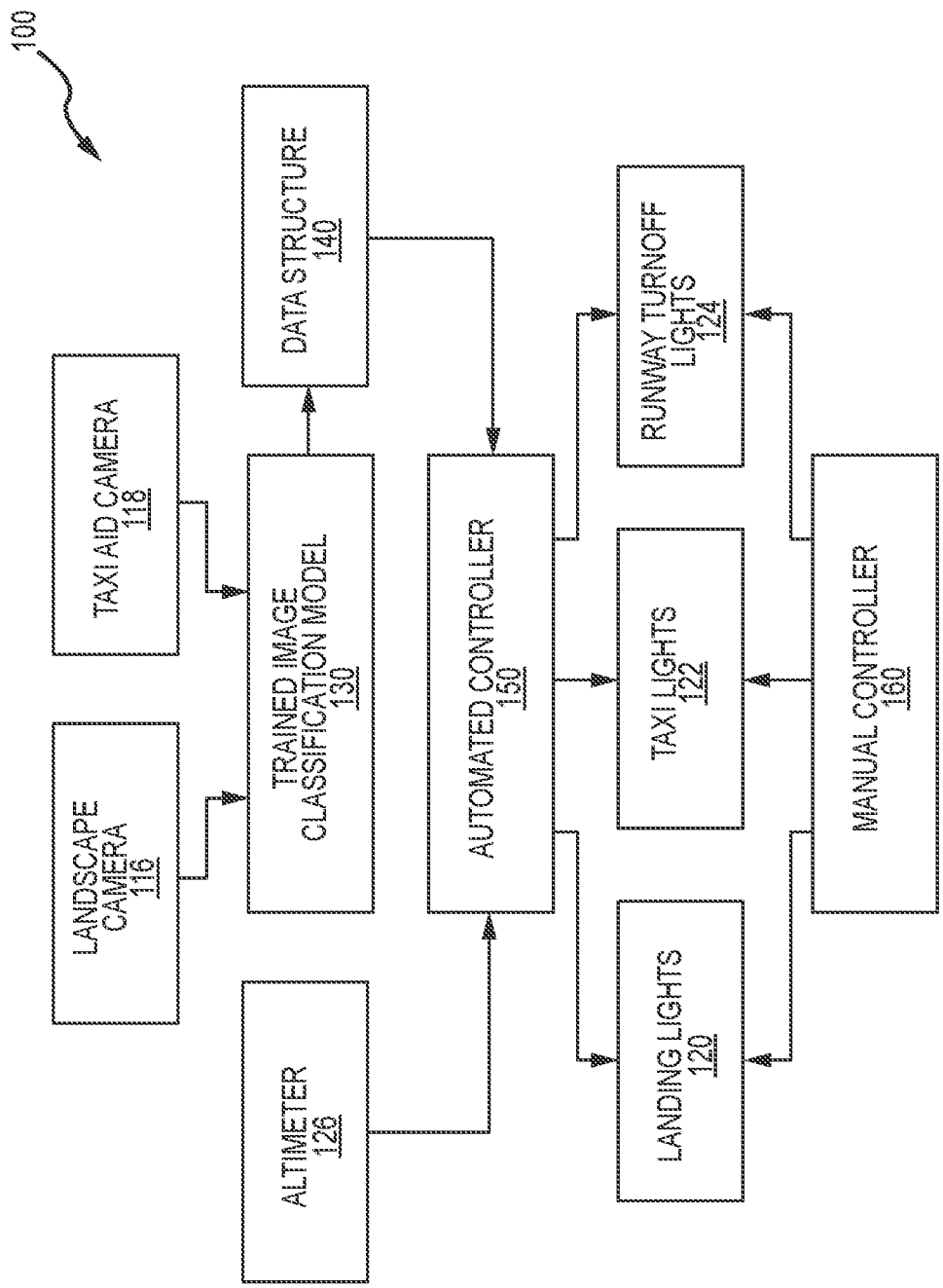
FIG. 2 is a block diagram of an aircraft that provides automated control of at least one exterior aircraft light and that utilizes a trained image classification module, in accordance with various embodiments.

A block diagram of the aircraft 100 is presented in FIG. 2, although it is applicable to an aircraft of any appropriate configuration. Both the landscape camera 116 and the taxi aid camera 118 are operatively connected with a trained image classification model 130. Generally, the aircraft 100 may utilize one or more cameras configured to acquire images exteriorly of the aircraft 100 for purposes of the exterior aircraft lighting control protocols addressed herein. Images that are captured/acquired by the cameras 116, 118 are provided to the trained image classification model 130 and as will be discussed in more detail below. The trained image classification model 130 may be operatively interconnected with a data structure 140 of any appropriate configuration (e.g., a database; such an operative interconnection being optional). This data structure 140 may be stored in any appropriate memory. The trained image classification model 130 is operatively interconnected with at least an automated controller 150. One or more of the data structure 140 and the automated controller 150 may be separate and discrete from the trained image classification model 130.

The aircraft 100 includes the noted automated controller 150 as well as a manual controller 160. Both the automated controller 150 and the manual controller 160 are operatively interconnected with and control operation of each of the landing lights 120, the taxi lights 122, and the runway turnoff lights 124. The automated controller 150 requires no manual intervention or input by any aircraft personnel (including no required input from the pilot). The manual controller 160 may be used by aircraft personnel (including the pilot) to manually control at least one aspect of the operation of the landing lights 120, taxi lights 122, and runway turnoff lights 124 (e.g., activating or turning on the lights 120, 122, 124). If the manual controller 160 is used to activate the landing lights 120, taxi lights 122, and runway turnoff lights 124, the aircraft 100 may be configured to operate these lights 120, 122, 124 at a predetermined intensity (e.g., for maximum output).

An altimeter 126 is also operatively interconnected with the automated controller 150, namely to provide altitude data to the automated controller 150. Image data from one or more of the cameras 116, 118, along with altitude data from the altimeter 126, may be used by the aircraft 100 to automatically control operation of each of the landing lights 120, taxi lights 122, and runway turnoff lights 124. Therefore, both altitude data (altimeter 126) and image data (cameras 116, 118) may be used by the automated controller 150.

Figure 3A:
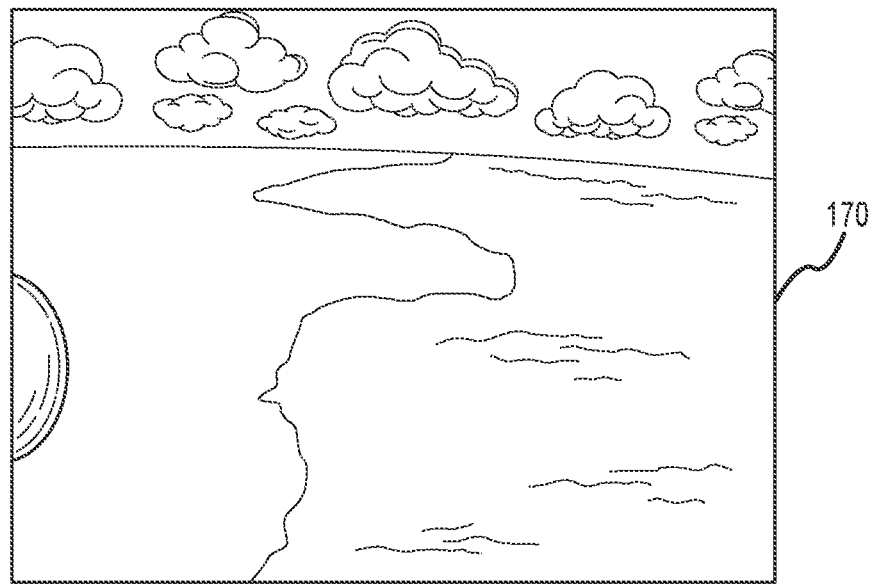
FIGS. 3A and 3B are representative images for use by the image classification module shown in FIG. 2, in accordance with various embodiments.
Figure 3B:
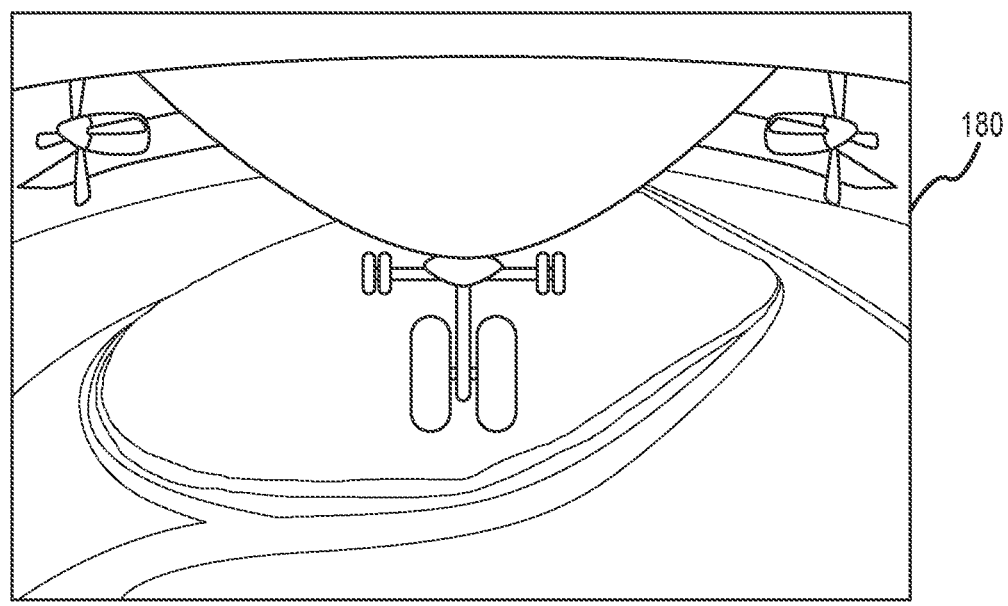

The trained image classification model 130 may be of a machine learning configuration (e.g., a support vector machine or SVM), or may be of a deep learning structure or configuration (e.g., a recurrent neural network or RNN; a feed-forward neural network; a convolutional neural network or CNN). Generally, the trained image classification model 130 is trained on images to control operation of the landing lights 120, the taxi lights 122, and the runway turnoff lights 124 based upon a visibility classification of these images that is determined by the trained image classification model 130. Representative images 170, 180 that may be used to train the trained image classification model 130 (or that may be classified by the model 130 after being trained) are illustrated in FIGS. 3A and 3B and are identified by reference numerals 170, 180, respectively. A large number of images will typically be used to train/define the trained image classification model 130, and each of these images will be labeled based upon the associated visibility/visibility condition (commonly referred to as "supervised learning").

Figure 4A:
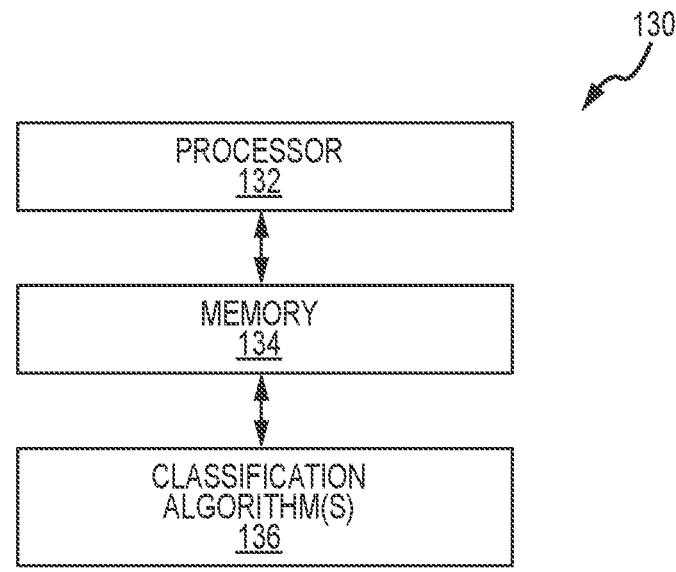
FIG. 4A is a block diagram of the trained image classification module shown in FIG. 2, in accordance with various embodiments.

A block diagram of the trained image classification model 130 is presented in FIG. 4A. The trained image classification model 130 includes one or more processors 132 (or a processing unit/system), memory 134, and one or more classification algorithms 136. The trained image classification model 130 may utilize any appropriate processing arrangement/architecture. The classification algorithm(s) 136 may be stored in the memory 134 and is/are used by the trained image classification model 130 to classify images for use in controlling operation of the landing lights 120, taxi lights 122, and runway turn off lights 124 (e.g., for outputting a visibility classification for a given image for use by the automated controller 150 to control operation of the landing lights 120, taxi lights 122, and/or runway turnoff lights 124).

Figure 4B:
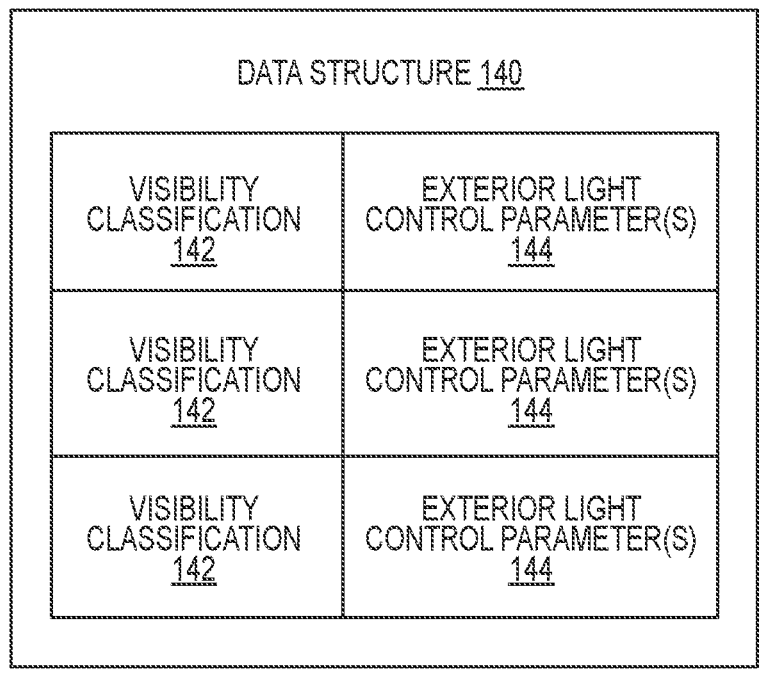
FIG. 4B is a block diagram of a data structure that may be used in conjunction with the trained image classification module shown in FIG. 2 to control operation of at least one exterior aircraft light, in accordance with various embodiments.

Visibility classification of images provided by one or more of the cameras 116, 118 is undertaken by the trained image classification model 130 to output (to the automated controller 150) a visibility classification for an image received from one or more of the cameras 116, 118. In this regard and referring to FIG. 4B, the data structure 140 (FIG.

2) may include any appropriate number of visibility classifications 142. Each visibility classification 142 has a corresponding exterior aircraft light control parameter(s) 144 (or more generally a control signal) in the data structure 140. A given exterior aircraft light control parameter(s) 144 will provide a desired light intensity output from the landing lights 120, the taxi lights 122, and the runway turnoff lights 124. As such, once the trained image classification model 130 determines a visibility classification for a given image from the landscape camera 116 or the taxi aid camera 118, and outputs the determined visibility classification to the automated controller 150, this in turn identifies the control parameter(s) 144 that will be used to control operation of the landing lights 120, the taxi lights 122, and the runway turnoff lights 124 (e.g., an intensity of light output from the corresponding light 120, 122, 124).

A determined visibility classification may be output from the trained image classification model 130 to the automated controller 150. The automated controller 150 may use this determined visibility classification from the trained image classification model 130 to control operation of the landing lights 120, the taxi lights 122, and the runway turnoff lights 124 (e.g., an intensity of light output from the corresponding lights 120, 122, 124). For instance, the automated controller 130 may use the data structure 140 to determine the exterior light control parameter(s) 144 that correspond with the determined visibility classification from the trained image classification model 130, and then the automated controller 130 may use the corresponding exterior light control parameter(s) 144 to control operation of the landing lights 120, the taxi lights 122, and the runway turnoff lights 124 (e.g., an intensity of light output from the corresponding lights 120, 122, 124).

Figure 4C:
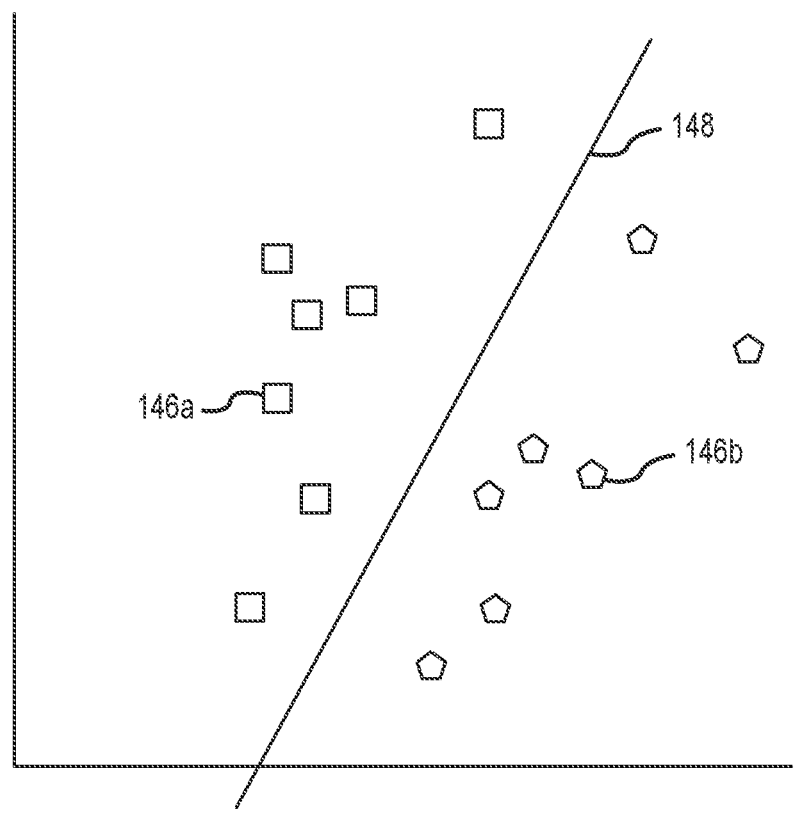
FIG. 4C is a schematic of two different groups of features that each correspond with a different visibility classification, and that may be utilized by the trained image classification module shown in FIG. 2.

As noted above, the trained image classification model 130 may be in the form of a support vector machine or SVM. A SVM is an algorithm in machine learning which may be used for visibility classification in accordance with this disclosure. Generally, a SVM may be used to separate data into two halves, depending on how the SVM learns from the data on which the SVM is trained. A schematic is presented in FIG. 4C regarding a SVM. A plurality of extracted features 146a are disposed on one side of a plane 148, while a different plurality of different extracted features 146b are disposed on the other side of the plane 148. The extracted features 146a, 146b may be local features (e.g., geometric) or global features (e.g., topographical or statistical). The extracted features 146a, 146b may include/be represented by any appropriate data in the image data, such as RGB pixel data, gray scale data, or the like from an image on which the SVM was trained. In any case, the SVM will assess image data provided by one or more of the cameras 116, 118 (e.g., extracted features from the image data) and will determine if the extracted features from the image data correspond with the extracted features 146a on one side of the plane 148 (one visibility classification), or with the features 146b on the other side of the plane 148 (a different visibility classification). The SVM may be of a multi-class classification SVM for purposes of the trained image classification model 130 (e.g., the trained image classification model 130 may use any appropriate number of comparative sets of extracted features, each of which would be at least generally in accord with FIG. 4C (e.g., one feature set on one side of a plane and corresponding with one visibility classification, and another feature set on the opposite side of this plane and corresponding with a different visibility classification)).

Any appropriate feature extraction algorithm may be used in conjunction with a SVM for purposes of the trained image classification model 130, for instance statistical features, features that are invariant to global deformation, and features that represent global and local properties of characters and that have high tolerances to distortions and style variations.

A CNN is another option for the trained image classification model 130 as previously noted. A CNN generally utilizes three types of layers—convolutional, pooling, and a fully-connected layer. In the convolutional layer, a filter is applied to the input (i.e., an image from one of the cameras 116, 118 of the aircraft 100) to create a feature map that summarizes the various features that were detected in the image. The output from the convolutional layer is transmitted to the pooling layer for reduction of the size of the feature map. The convolutional and pooling processes may be repeated, as required. In any case, the resulting feature map is transmitted to the fully-connected layer for comparison of probability of features existing in conjunction with others to identify the corresponding visibility classification. That is and with regard to the trained image classification model 130 being in the form of a CNN, an image from the cameras 116 and/or 118 is the input to the CNN. This data is processed in different layers of the CNN to classify them into different categories in the last layer of the CNN (e.g., for determining a visibility classification). Each layer of the neural network (e.g., hidden layers) perform different functions to work on all pixels of the input image (e.g., feature extraction, flattening of the image, and the like).

A RNN is yet another option for the trained image classification model 130 as previously noted. RNNs have one or more recurrent or cyclic connections. Generally, the cyclic connection in a RNN (for the case of the trained image classification model 130) records temporal relations or dependencies regarding the image provided by one of the cameras 116, 118 of the aircraft 100 and that is used to determine the corresponding visibility classification. That is for the trained image classification model 130 being in the form of a RNN, the information cycles through a loop. When the RNN makes a decision (determines a visibility classification in this case), the RNN considers the current input (an image from the cameras 116 and/or 118) as well as what the RNN has learned from prior inputs (e.g., images from the cameras 116 and/or 118) that were previously provided to and processed by the RNN.

Figure 5:
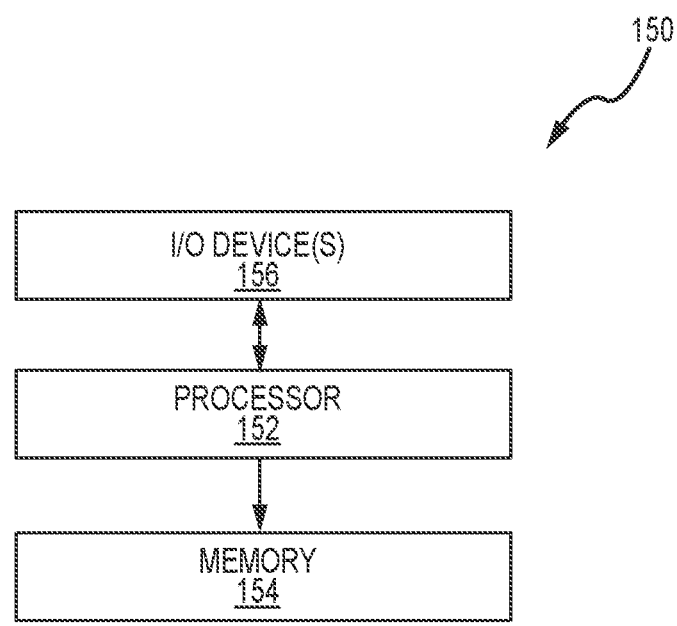
FIG. 5 is a block diagram of an automated controller shown in FIG. 2, in accordance with various embodiments.

A block diagram of the automated controller 150 is presented in FIG. 5. The automated controller 150 includes one or more processors 152 (or processing unit/system), memory 154, and one or more input/out devices 150 (e.g., for receiving altitude data from the altimeter 126; for receiving a visibility classification output from the trained image classification model 130; for outputting a control signal to each of the landing lights 120, taxi lights 122, and runway turnoff lights 124). The automated controller 150 may utilize any appropriate processing arrangement/architecture. As noted, altitude data may be used to automatically activate/turn on the landing lights 120, taxi lights 122, and runway turnoff lights 124. In this regard, an altitude condition 208 (e.g., FIG. 7) may be stored in the memory 154 for use by the automated controller 150.

Figure 6:
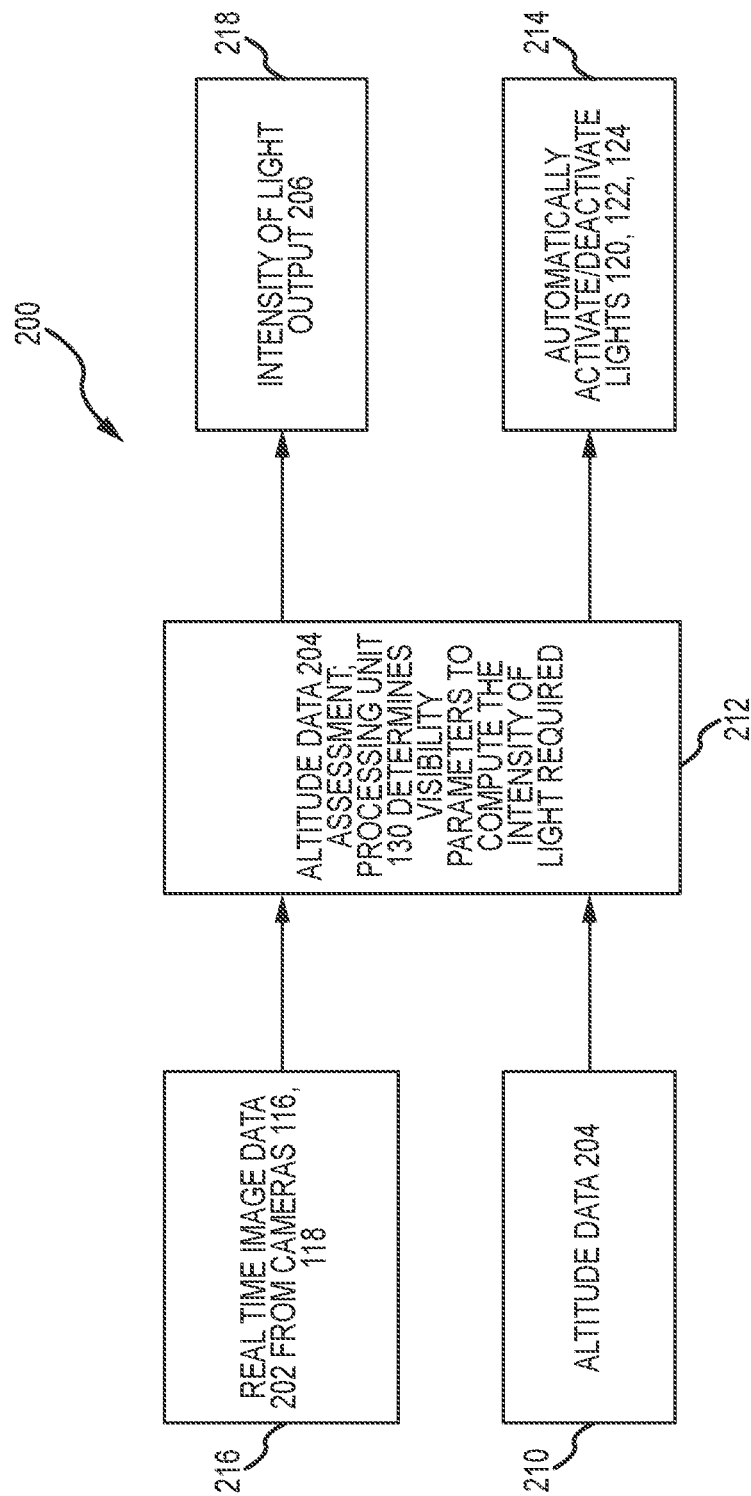
FIG. 6 is an exterior aircraft lighting control protocol in accordance with various embodiments.

FIG. 6 illustrates an exterior aircraft lighting (or light) control protocol that may be utilized by the aircraft 100 and that is identified by reference numeral 200. Altitude data 204 from the altimeter 126 may be provided (210) to the automated controller 150. In the event that the altitude data 204 is determined by the automated controller 150 to be less than or no more than a predetermined value of any appropriate magnitude, the automated controller 150 will automatically turn on the landing lights 120, the taxi lights 122, and the runway turnoff lights 124 (212)—no intervention by any personnel of the aircraft 100 is required. As such, the protocol 200 may be configured such that the landing lights 120, the taxi lights 122, and the runway turnoff lights 124 will be automatically turned on (and remain on) while the aircraft 100 is on the ground and other than in a stationary/parked position, during takeoff, during landing of the aircraft 100, or any combination thereof. Once the aircraft 100 takes off and then reaches the noted predetermined altitude, the automated controller 150 will automatically turn off the landing lights 120, the taxi lights 122, and the runway turnoff lights 124 (214)—again, no intervention by any personnel of the aircraft 100 is required.

Real-time images/image data 202 captured/acquired by the landscape camera 116 or the taxi aid camera 118 (216) are transmitted to the trained image classification model 130 (212) in the case of the exterior aircraft lighting control protocol 200 of FIG. 6. The trained image classification model 130 determines the visibility classification of this image/image data 202 (212). Once this visibility classification has been determined (212) by the trained image classification model 130 and output to the automated controller 150, the corresponding exterior light control parameter(s) 144 (or more generally a control signal) are sent by the automated controller 150 to the landing lights 120, the taxi lights 122, and the runway turnoff lights 124 (218) such that these lights 120, 122, 124 provide a corresponding intensity of light output 206.

Figure 7:
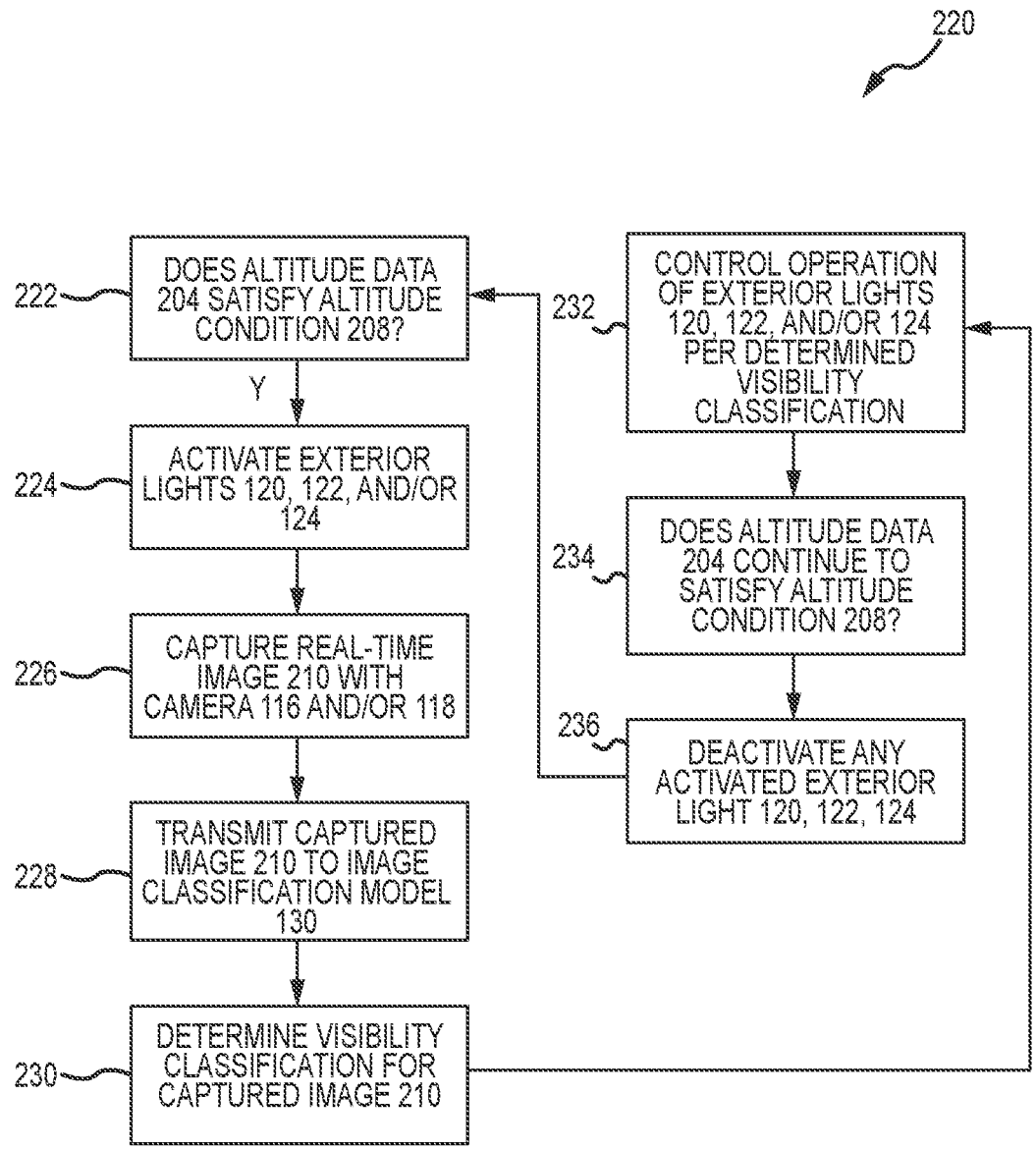
FIG. 7 is an exterior aircraft lighting control protocol in accordance with various embodiments.

An exterior aircraft lighting (or light) control protocol is illustrated in FIG. 7 and is identified by reference numeral 220. The altitude data 204 provided by the altimeter 126 (FIG. 2) is assessed to determine if it satisfies an altitude condition 208 (222). Again, this determination may be undertaken by/utilizing the automated controller 150. This altitude condition 208 may be a predetermined value of any appropriate magnitude, and again may be stored in memory 154 of the automated controller 150 (FIG. 5). The altitude condition 208 may exist when the current altitude of the aircraft 100 (via the altitude data 204) is less than or no more than a predetermined altitude or value (e.g., while the aircraft 100 is on the ground; during takeoff; during landing). If the altitude data 204 satisfies the altitude condition 208 (222), a number of actions may be automatically initiated (i.e., without any intervention or action by any personnel of the aircraft 100). One such action is that at least one of the landing lights 120, the taxi lights 122, and the runway turnoff lights 124 may be activated (224) and this may be done through the automated controller 150 (the landing lights 120, taxi lights 122, and runway turnoff lights 124 may be simultaneously activated (224)). Another such action is that a real-time image 210 is captured/acquired (226) by at least one of the cameras 116, 118 (e.g., an image that is exterior of the aircraft 100).

The captured image 210 is transmitted to the trained image classification model 130 (228). The visibility classification for the captured image 210 is determined using the trained image classification model 130 (230). The visibility classification determined by the trained image classification model 130 may be output or provided to the automated controller 150. Operation of at least one of the exterior aircraft lights 120, 122, 124 is thereafter controlled per the determined visibility classification (232), for instance by the associated exterior light control parameter(s) 144 (e.g., via the automated controller 150 using this determined visibility classification to acquire the relevant exterior light control parameter(s) 144, for instance using the data structure 140 of FIG. 4B). This "control" may be of the intensity of the light that is output from the controlled exterior aircraft lights 120, 122, and/or 124. The current altitude data 204 from the altimeter 126 may continue to be assessed for satisfaction of the altitude condition 208 (234). If the altitude condition 208 is determined to no longer exist (e.g., the aircraft 100 is now above a predetermined altitude), activated ones of the exterior aircraft lights 120, 122, 124 may be deactivated (236) and including simultaneously (e.g., using the automated controller 150).

The exterior aircraft light control protocol 220 may be configured to determine a visibility classification for a captured image 210 from each of the landscape camera 116 and the taxi aid camera 118 (e.g., captured images 210 from the cameras 116, 118 that have a common time stamp). In the event that the trained image classification model 130 determines a different visibility classification for these two different captured images 210, the protocol 220 may be configured to utilize the determined visibility classification that provides a higher intensity light output for activated ones (224) of the exterior aircraft lights 120, 122, 124 (e.g., if only the exterior aircraft light 120 has been activated, only its light output will be controlled in the noted manner; if only the exterior aircraft lights 120, 122 have been activated, only their respective light outputs will be controlled in the noted manner).

Figure 8:
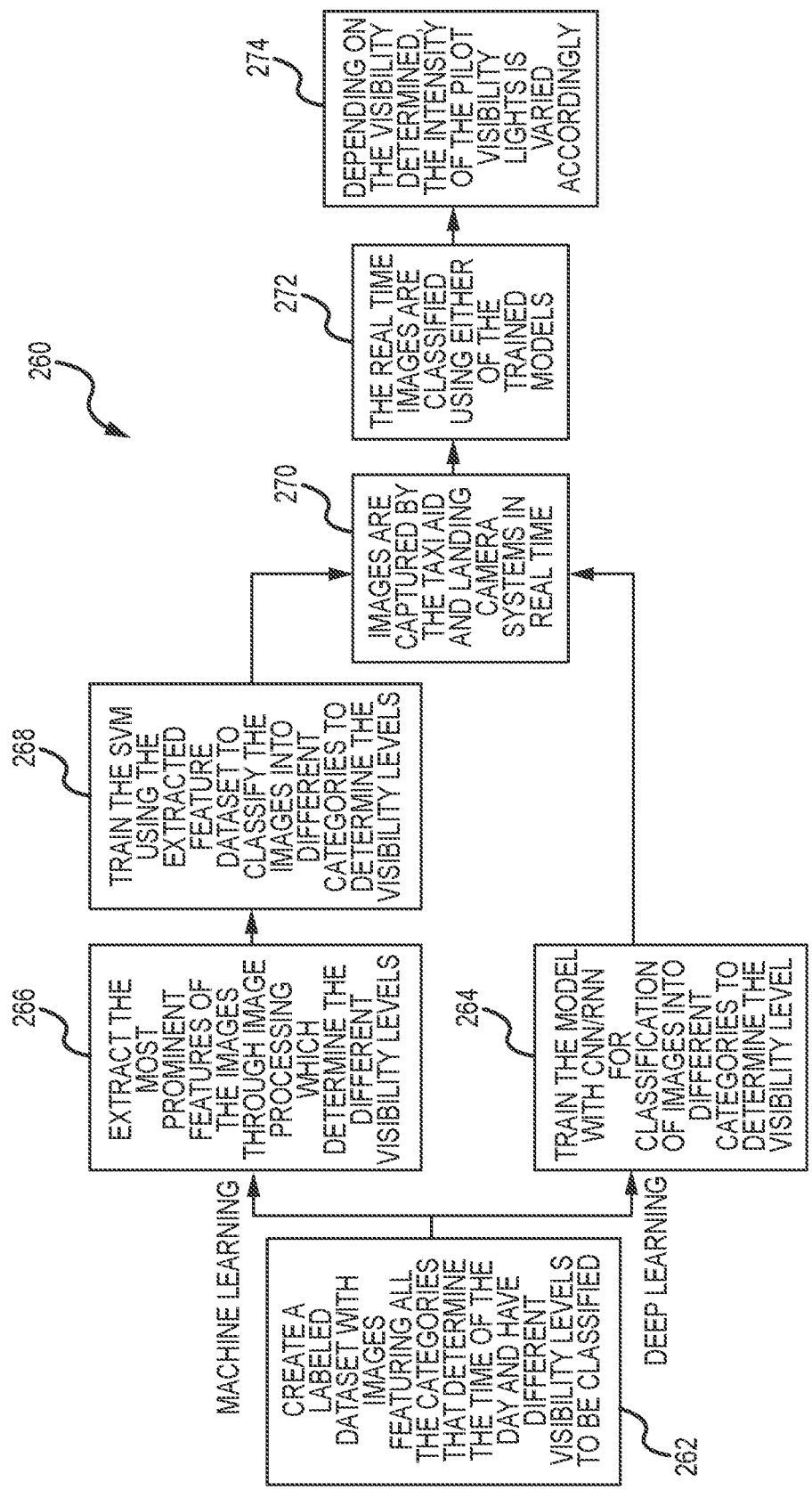
FIG. 8 is an exterior aircraft lighting control protocol that includes training of an image classification model in accordance with various embodiments.

FIG. 8 presents an exterior aircraft lighting (or light) control protocol 260 that addresses training of the image classification model 130 and subsequent use thereof, and including at least generally in accordance with the foregoing. A database is created that includes various images from different times of the day (e.g., daytime; nighttime) and/or of different visibility/lighting conditions (e.g., cloudy, foggy, sunny), and each of these images is categorized, assigned, or labeled with a visibility classification 142 (262). Image processing may be used to identify the most prominent features in each of the images and that will be used to identify the corresponding visibility classification 142 (266). This may entail using a feature extraction algorithm (266, 268). A support vector machine (SVM) or a recurrent neural network (RNN) that uses supervised learning may be created to categorize/classify images (268). That is, the image classification model 130 is created and trained (262, 266, 268). After training, an image may be captured by one or more exterior cameras on the aircraft 100, for instance the landscape camera 116 and/or the taxi aid camera 118 (270). The trained image classification model 130 is then used to categorize this captured image using image processing to interpret the visibility, for instance to determine the corresponding visibility classification (272). The exterior light control parameter(s) 144 associated with the determined visibility classification may then be used to control the operation of the exterior aircraft lights 120, 122, 124 in accordance with the foregoing (274).

The protocol 260 of FIG. 9 also illustrates that the trained image classification model 130 may be of a machine learning configuration or of a deep learning configuration. In each case, a labeled data set is created (262). This data set includes various images from different times of the day (e.g., daytime; nighttime) and/or of different visibility/lighting conditions (e.g., cloudy, foggy, sunny), and each of these images is categorized, assigned, or labeled with a visibility classification 142 (262). In the case where the image classification model 130 is of a deep learning configuration (e.g., CNN, RNN), feature extraction is not required to train the image classification model (264). In contrast and for the case where the image classification model 130 is of a machine learning configuration and as addressed above, feature extraction (266) is used for each of the images that are included in a labeled dataset (262) (stated another way, features are extracted for the labeled images (262)) and thereafter the image classification model 130 is trained using only the extracted features from each of the images (268).

An image may be captured by one or exterior cameras on the aircraft 100, for instance the landscape camera 116 and/or the taxi aid camera 118 (270). The trained image classification model 130 is then used to categorize this captured image according to the training to interpret the visibility, for instance to determine the corresponding visibility classification (272). The exterior light control parameter(s) associated with the determined visibility classification may then be used to control the operation of the exterior aircraft lights 120, 122, 124 (274), for instance using the corresponding exterior light control parameter(s) 144 in accordance with the foregoing.

In various embodiments and including in accordance with the foregoing, memory is configured to store information used in the control of exterior aircraft lights 120, 122, 124. In various embodiments, memory comprises a computer-readable storage medium, which, in various embodiments, includes a non-transitory storage medium. In various embodiments, the term "non-transitory" indicates that the memory is not embodied in a carrier wave or a propagated signal. In various embodiments, the non-transitory storage medium stores data that, over time, changes (e.g., such as in a random access memory (RAM) or a cache memory). In various embodiments, memory comprises a temporary memory. In various embodiments, memory comprises a volatile memory. In various embodiments, the volatile memory includes one or more of RAM, dynamic RAM (DRAM), static RAM (SRAM), and/or other forms of volatile memories.

In various embodiments, memory is configured to store computer program instructions for execution by a processor (e.g., processor 132; processor 152) in relation to the control of exterior aircraft lights 120, 122, 124. In various embodiments, applications and/or software utilize(s) memory in order to temporarily store information used during program execution. In various embodiments, memory includes one or more computer-readable storage media. In various embodiments, memory is configured to store larger amounts of information than volatile memory. In various embodiments, memory is configured for longer-term storage of information. In various embodiments, memory includes non-volatile storage elements, such as, for example, electrically programmable memories (EPROM), electrically erasable and programmable (EEPROM) memories, flash memories, floppy discs, magnetic hard discs, optical discs, and/or other forms of memories.

In various embodiments, a processor used in relation to the control of exterior aircraft lights 120, 122, 124 (e.g., processor 132; processor 152) is configured to implement functionality and/or process instructions. In various embodiments, such processor is configured to process computer instructions stored in memory. In various embodiments, such a processor includes one or more of a microprocessor, a controller, a digital signal processor (DSP), an application specific integrated circuit (ASIC), a field-programmable gate array (FPGA), or other equivalent discrete or integrated logic circuitry. System program instructions and/or processor instructions may be loaded onto memory that is used in relation to the control of exterior aircraft lights 120, 122, 124. The system program instructions and/or processor instructions may, in response to execution by operator, cause the relevant processor to perform various operations used in relation to the control of exterior aircraft lights 120, 122, 124.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of controlling an exterior aircraft light, comprising:
    acquiring altitude data of an aircraft;
    identifying a first altitude condition, said first altitude condition being that said altitude data is one of less than or no greater than a predetermined altitude, wherein said identifying is executed by a controller;
    activating a first exterior aircraft light in response to an existence of said first condition being identified, wherein said activating is executed by said controller;
    capturing a first image exteriorly of said aircraft;
    transmitting said first image to a trained image classification model;
    determining a first visibility classification for said first image using said trained image classification model;
    controlling a magnitude of a light output from said first exterior aircraft light based on said first visibility classification
    capturing a second image exteriorly of said aircraft;
    transmitting said second image to said trained image classification model;
    determining a second visibility classification for said second image using said trained image classification model; and
    controlling operation of said first exterior aircraft light using whichever of said first visibility classification and said second visibility classification that maximizes a magnitude of a light output from said first exterior aircraft light.

2. The method of claim 1, wherein said first altitude condition is stored in memory and is accessible by said controller.

3. The method of claim 1, wherein said activating is automatically executed by said controller.

4. The method of claim 1, wherein said activating is executed by said controller without intervention by any personnel of said aircraft.

5. The method of claim 1, wherein said first exterior aircraft light is selected from the group consisting of landing lights, taxi lights, and runway turnoff lights.

6. The method of claim 1, wherein said activating further comprises activating a second exterior aircraft light and a third exterior aircraft light, wherein said first exterior aircraft light comprises landing lights, wherein said second exterior aircraft light comprises taxi lights, wherein said third exterior aircraft light comprises runway turnoff lights, and wherein said controlling further comprises controlling operation of each of said first exterior aircraft light, said second exterior aircraft light, and said third exterior aircraft light using said visibility classification determined by said trained image classification model.

7. The method of claim 1, wherein said controlling is automatically executed by said controller.

8. The method of claim 1, wherein said trained image classification model is selected from the group consisting of a support vector machine, a recurrent neural network, or a convolutional neural network.

9. The method of claim 1, wherein said trained image classification model is of a configuration selected from the group consisting of a machine learning configuration or a deep learning configuration.

10. An exterior aircraft lighting control system comprising:
    a first altitude condition stored in a non-transitory memory;
    a first exterior aircraft light;
    a trained image classification model, wherein said trained image classification model is configured to determine a visibility classification of an image; and
    a controller operatively interconnected with each of said first exterior aircraft light and said trained image classification model, said controller is configured to automatically operate said first exterior aircraft light based upon said visibility classification output from said trained image classification model, and said visibility classification output from said trained image classification model controls a magnitude of a light output from said first exterior aircraft light.

11. The exterior aircraft lighting control system of claim 10, wherein said controller is configured to automatically activate said first exterior aircraft light when said first altitude condition is satisfied.

12. The exterior aircraft lighting control system of claim 10, wherein said first exterior aircraft light is selected from the group consisting of landing lights, taxi lights, and runway turnoff lights.

13. The exterior aircraft lighting control system of claim 10, wherein said trained image classification model is selected from the group consisting of a support vector machine, a recurrent neural network, or a convolutional neural network.

14. The exterior aircraft lighting control system of claim 10, wherein said trained image classification model is of a configuration selected from the group consisting of a machine learning configuration or a deep learning configuration.

15. The exterior aircraft lighting control system of claim 10, further comprising a data structure that in turn comprises a plurality of stored visibility classifications, wherein each stored visibility classification is associated with at least one exterior light control parameter.

16. The exterior aircraft lighting control system of claim 15, wherein said controller is operatively interconnected with said data structure.

17. An article of manufacture comprising a processor and a tangible, non-transitory computer-readable storage medium having instructions stored thereon that, in response to execution by the processor, cause the processor to perform operations comprising:
   acquiring altitude data of an aircraft;
   identifying a first altitude condition, said first altitude condition being that said altitude data is one of less than or no greater than a predetermined altitude, wherein said identifying is executed by a controller;
   activating a first exterior aircraft light in response to an existence of said first condition being identified, wherein said activating is executed by said controller;
   capturing a first image exteriorly of said aircraft;
   transmitting said first image to a trained image classification model;
   determining a first visibility classification for said first image using said trained image classification model;
   controlling a magnitude of a light output from said first exterior aircraft light based on said first visibility classification
   capturing a second image exteriorly of said aircraft;
   transmitting said second image to said trained image classification model;
   determining a second visibility classification for said second image using said trained image classification model; and
   controlling operation of said first exterior aircraft light using whichever of said first visibility classification and said second visibility classification that maximizes a magnitude of a light output from said first exterior aircraft light.

18. The article of manufacture of claim 17, wherein the trained image classification model is selected from the group consisting of a support vector machine, a recurrent neural network, or a convolutional neural network.

* * * * *